(12) United States Patent
Chung et al.

(10) Patent No.: US 11,674,813 B1
(45) Date of Patent: Jun. 13, 2023

(54) MULTIPLE ESTIMATED TIMES OF ARRIVAL COMPUTATION

(71) Applicant: Samsara Inc., San Francisco, CA (US)

(72) Inventors: Helen Chung, Great Falls, VA (US); Xin Chen, New York, NY (US); Tirso Peguero, San Francisco, CA (US); Sean McGee, San Francisco, CA (US); Sachal Nanda, Alamo, CA (US); Yogesh Bhumralkar, Belmont, CA (US); Eric Shreve, Calistoga, CA (US); Matthew Morales, Ventura, CA (US); Noah Ray, Philadelphia, PA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/811,034

(22) Filed: Jul. 6, 2022

Related U.S. Application Data

(60) Provisional application No. 63/365,339, filed on May 26, 2022.

(51) Int. Cl.
*G01C 21/34* (2006.01)
*G01C 21/36* (2006.01)
*G08G 1/00* (2006.01)

(52) U.S. Cl.
CPC ..... *G01C 21/3453* (2013.01); *G01C 21/3691* (2013.01); *G08G 1/20* (2013.01)

(58) Field of Classification Search
USPC ............................................................ 701/533
See application file for complete search history.

(56) References Cited

U.S. PATENT DOCUMENTS

2016/0356615 A1* 12/2016 Arata ................. G01C 21/3438
2017/0270790 A1* 9/2017 Neiger .................... G08G 1/127
2021/0293555 A1* 9/2021 Roherty ............. G01C 21/3697

* cited by examiner

*Primary Examiner* — Tyler D Paige
(74) *Attorney, Agent, or Firm* — Schwegman Lundberg & Woessner, P.A.

(57) ABSTRACT

Disclosed are systems, methods, and non-transitory computer-readable media for generating estimated times of arrival for multiple stops along a route. A route management system provides for: accessing a route tracking report associated with a vehicle to identify a set of stops along a route; determining a current location of the vehicle; computing, based on a current location of the vehicle, a first estimated time of arrival (ETA) associated with a first stop of the set of stops and a second ETA associated with a second stop of the set of stops; and generating, for display, first and second identifiers of the first and second stops associated with the first and second ETAs of the first and second stops.

20 Claims, 9 Drawing Sheets

MULTIPLE ESTIMATED TIMES OF ARRIVAL COMPUTATION

PRIORITY APPLICATION

This application claims priority to U.S. Patent Application Ser. No. 63/365,339, filed May 26, 2022, the disclosure of which is incorporated by reference herein in its entirety.

TECHNICAL FIELD

Embodiments of the present subject matter relate generally to vehicles and, more specifically, to computing estimated times of arrival (ETA) for various route stops.

BACKGROUND

Fleet managers track the movement of their vehicles to ensure that they are operating as expected. For example, fleet managers may track whether a vehicle began a route at an expected time, arrived at scheduled stops along the route, and completed the route. This process is often performed manually; however, systems have been developed to automate this process. These systems utilize geofences to determine when a vehicle has arrived and/or departed a scheduled stop. In some cases, a vehicle may be scheduled to stop at multiple locations that are within a proximity of each other. For example, a delivery truck may be scheduled to deliver packages at multiple stores located in the same shopping center.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
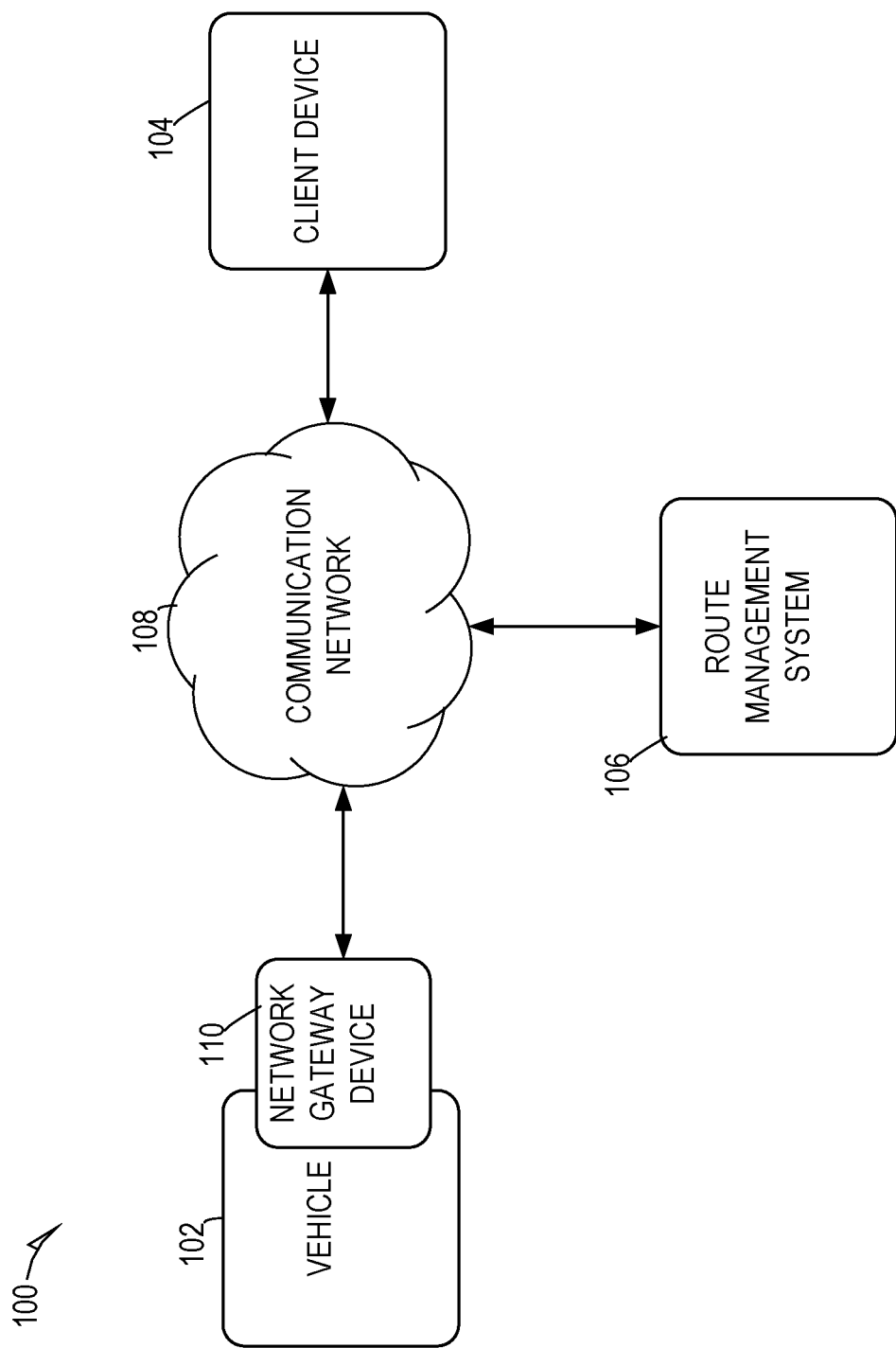
FIG. 1 shows a system for multiple stop ETA computation, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations. Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment and the embodiments can be combined with each other.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for computing multiple ETAs for respective stops along a route. A route management system provides for automated fleet tracking using respective ETAs of the stops along the route. For example, the route management system enables fleet managers to define and assign routes for vehicles in a fleet. A route may be defined based on a set of route variables that describe the route. For example, the set of route variables may include a beginning and ending location of the route, scheduled stops along the route each associated with a geographical location, an order at which the vehicle is to stop at each scheduled stop, a scheduled beginning and ending time of the route, a scheduled arrival and departure time at the scheduled stops, the amount of time the vehicle remains stopped at an individual stop or location, and the like.

The route management system uses the set of route variables defining each route along with sensor data describing the geographic location and/or movement of the vehicles to generate route tracking reports. A route tracking report is a file or document that includes data indicating the movement of a vehicle in relation to its assigned route. For example, the route tracking report may indicate whether a vehicle began and/or ended its route on time, arrived at each of its scheduled stops, arrived and/or departed from each scheduled stop on time, and completed the route in the correct order; the list of stops and their associated locations remaining on the route, and the like.

Geofences are used to determine when vehicles have arrived and/or departed from scheduled stops along a route. A geofence is a virtual perimeter for a real-world geographic area. Geofences are established to encompass each scheduled stop along a route. The route management system uses the geofences along with location data describing the current location of the vehicles to determine whether the vehicles have arrived and/or departed the scheduled stops and to compute ETAs or updated ETAs for various stops. For example, the route management system may determine that a vehicle has arrived at a scheduled stop if the current location of the vehicle has been within the geofence encompassing the scheduled stop for a threshold period of time. Similarly, the route management system may determine that the vehicle has departed the scheduled stop if the current location of the vehicle is subsequently outside of the geofence encompassing the scheduled stop for another threshold period of time. The route management system can then use the information indicating that the vehicle has departed from the scheduled stop to compute or update one or more ETAs for one or more subsequent stops along the route.

As explained earlier, problems arise with current systems when multiple stops are scheduled along a route. Current systems typically determine an ETA for a current scheduled stop and fail to account for the ETA at subsequent scheduled stops. Namely, the current systems can determine that a vehicle is enroute to a particular destination associated with a current route in progress and use that destination to estimate the time of arrival at the destination. However, providing the ETA only for the particular destination fails to inform the driver about when the entire route will end (e.g., when all of the stops along the route will be completed). Oftentimes, drivers need to plan their days and driving schedule for other routes based on when a current route will end. Because current systems fail to inform the drivers about when each stop along the route will be reached, the drivers miss opportunities and are unable to efficiently plan their breaks. This can result in drivers that end up being too tired to complete routes on time and can be dangerous to the well-being of the drivers. Also, the recipients at the stops can become frustrated by being provided very large windows of time for the deliveries rather than a specific and accurate ETA.

To alleviate this issue, the route management system provides for multiple ETA computations for each stop along a route. For example, the route management system accesses a route tracking report associated with a vehicle to identify a set of stops along a route. The route management system determines a current location of the vehicle and computes, based on a current location of the vehicle, a first ETA associated with a first stop of the set of stops and a second ETA associated with a second stop of the set of stops. The route management system generates, for display, first and second identifiers of the first and second stops associated with the first and second ETAs of the first and second stops.

In some examples, to compute the ETAs, the route management system queries a mapping application based on the current location and a first location of the first stop to determine a first time of travel between the current location and the first location of the first stop and queries the mapping application based on the first location of the first stop and a second location of the second stop to determine a second time of travel between the first stop and the second stop. The route management system may determine the first ETA by adding to the current time and the first time of travel and may determine the second ETA by adding to the first ETA the second time of travel.

In some examples, the route management system can account for how long the vehicle spends at each stop in order to more accurately determine the ETA for subsequent stops. In some cases, the length of time spent at each stop can be determined by accessing historical stop information indicating how long vehicles carrying similar cargo spent at each stop at a given time of day.

The route management system may utilize prompts to allow drivers to view the ETA for each stop and to alert recipients at the stops when the vehicles will arrive. For example, the route management system may display a plurality of route identifiers associated with a plurality of routes and determine that a route identifier of the plurality of route identifiers corresponding to the route is associated with a currently active route. In response, the route management system displays, in association with the route identifier, a plurality of progress bars each associated with a respective stop of the set of stops along the route. The route management system may receive input that identifies a given progress bar of the plurality of progress bars (e.g., by hovering a cursor over the given progress bar) and, in response, display a prompt including the first ETA of the first stop and a description of the first stop.

FIG. 1 shows a system 100 for multiple stop ETA computation. As shown, multiple devices (i.e., vehicle 102, client device 104, and route management system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, a wearable device, a watch, or a portable computing device, such as a laptop, smart phone, or a tablet personal computer (PC). A computing device can include some or all of the features, components, and peripherals of the machine 900 shown in FIG. 9.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The vehicle 102 may be any type of vehicle, such as an automobile, bicycle, motorcycle, skateboard, semi-trailer truck, plane, bus, train, ship, a vessel, and the like. As shown, the vehicle 102 includes a network gateway device 110 (e.g., vehicle gateway) that allows for remote communication between the vehicle 102 and one or more remote computing devices via the communication network 108.

The network gateway device 110 is a hardware device that acts as a gate to a network and enables traffic to flow in and out of the network to other networks. For example, the network gateway device 110 can be established as an edge device of a network or system of nodes within the vehicle 102 (e.g., vehicle networking system). For example, the network or system of nodes may include a variety of sensors, computing devices (e.g., electronic control units (ECUs)), actuators, etc. deployed within the vehicle 102. The network gateway device 110 facilitates wireless communication capabilities by connecting to wireless networks (e.g., cellular, wireless local area network, satellite communication networks, etc.), for purposes of communicating with remote computing devices. The network gateway device 110 may also provide additional functionality, such as firewall functionality, by filtering inbound and outbound communications, disallowing incoming communications from suspicious or unauthorized sources, etc.

Use of the network gateway device 110 allows for a remote computing device to transmit data and/or commands to the vehicle 102. Similarly, the network gateway device 110 allows for the vehicle 102 to transmit data, such as sensor data gathered by sensors of the vehicle 102, to a remote computing device. The vehicle 102 may be equipped with a variety of sensors that capture data describing performance of a vehicle 102 and its surroundings. For example, the sensors may include engine speed sensors, fuel temperature sensors, voltage sensors, pressure sensors, radar sensors, location sensors, global positioning system (GPS) sensors that provide a current geographical location of the vehicle 102, light detection and ranking (LIDAR) sensors, imaging sensors (e.g., camera, video camera), and the like.

The route management system 106 is one or more computing devices that allow for generation and management of routes as well as automated route tracking. For example, the route management system 106 may allow administrators to generate routes and assign the generated routes to vehicles 102. The route management system 106 may also provide automated route tracking of the vehicles 102 based on the assigned routes. The route management system 106 may also provide ETAs for multiple stops, destinations or locations along a route.

To utilize the functionality of the route management system 106, users (e.g., fleet managers) may use a client device 104 that is connected to the communication network 108 by direct and/or indirect communication. Although the shown system 100 includes only one client device 104 and one vehicle 102, this is only for ease of explanation and is not meant to be limiting. One skilled in the art would appreciate that the system 100 can include any number of client devices 104 and/or vehicles 102. Further, the route management system 106 may concurrently accept communications from and initiate communication messages and/or interact with any number of client devices 104 and vehicles 102, and support connections from a variety of different types of client devices 104, such as desktop computers; mobile computers; mobile communications devices, e.g., mobile phones, smart phones, wearables, watches, glasses, tablets; smart televisions; set-top boxes; and/or any other network enabled computing devices. Hence, the client devices 104 may be of varying type, capabilities, operating systems, and so forth.

A user interacts with a route management system 106 via a client-side application installed on the client device 104. In some embodiments, the client-side application includes a component specific to the route management system 106. For example, the component may be a stand-alone application, one or more application plug-ins, and/or a browser extension. However, the users may also interact with the route management system 106 via a third-party application, such as a web browser or messaging application, that resides on the client device 104 and is configured to communicate with the route management system 106. In either case, the client-side application presents a user interface (UI) for the user to interact with the route management system 106. For example, the user interacts with the route management system 106 via a client-side application integrated with the file system or via a webpage displayed using a web browser application.

The UI of the client-side application can present a plurality of ETAs of various locations, destinations, or stops along a route. The UI can also present identifiers of the various locations, destinations, or stops along the route, selection of which (e.g., by hovering over a given identifier) causes presentation of the ETA associated with the corresponding location, destination, or stop. The UI of the client-side application is discussed in more detail in connection with FIGS. 6 and 7 below.

As discussed earlier, the route management system 106 enables fleet managers to generate and track vehicle routes. For example, the route management system 106 may provide a UI that allows fleet managers to generate vehicle routes. A vehicle route is a route to be traversed by a vehicle 102 that is defined by a set of route variables. For example, the set of route variables may include a beginning and ending geographic location of the route, scheduled geographic stops along the route, geographical locations of such stops or destinations, geofences associated with each stop or destination, scheduled amount of time to be spent at each stop before departing to a subsequent stop or destination, an order at which the vehicle 102 is to stop at each scheduled stop, a scheduled beginning and ending time of the route, a scheduled arrival and departure time at the scheduled stops, and the like.

In some examples, a vehicle 102 can be provided multiple routes each including a respective set of route variables. The multiple routes may include some of the same stops or destinations (e.g., stops or destinations may overlap between routes) or the multiple routes may include exclusively unique stops or destinations. A vehicle 102 may only traverse one route at a time. Namely, the vehicle 102 can drive along a selected route to each stop of the selected route and such stops are tracked for the selected route. Stops of other routes that have not been selected may not be tracked while the vehicle is navigating or driving along a selected route. For example, if two routes include a same particular stop or destination, when the vehicle 102 reaches or crosses a geofence of the particular stop or destination associated with a first of the routes which is currently an active route (e.g., because the route was selected for navigation), the particular stop or destination is marked completed in association with the first of the routes but remains incomplete or scheduled in association with a second of the two routes.

The UI provided by the route management system 106 enables fleet managers to select the set of route variables to define a route. For example, the UI may provide a listing of geographic locations and times that a fleet manager may select from to define a route. A fleet manager may use the UI to select geographic locations to be included in the route, such as a beginning location, end location, geographical locations of such stops or destinations, geofences associated with each stop or destination, scheduled amount of time to be spent at each stop before departing to a subsequent stop or destination, and scheduled stops, as well as select an order in which the geographic locations are to be traversed along the route. The UI may also enable a fleet manager to assign times to the selected geographic locations, such as scheduled start time, arrival time, and/or departure time for each. The UI may also enable the fleet manager to select which route is currently active and which are inactive for a particular vehicle 102. The UI may also provide notifications or alerts associated with an active route indicating ETAs associated with stops along the route and/or whether a vehicle 102 is early or late with respect to the scheduled arrival/departure time of one or more stops.

The UI may also enable fleet managers to assign the generated routes to individual vehicles 102 and/or vehicle operators. For example, the user interface may present a listing of individual vehicles 102 and/or vehicle operators from which the fleet manager may select. As another example, the UI may enable an administrator to enter data identifying a vehicle 102 or vehicle operator, as well as enter a new vehicle 102 or vehicle operator.

The route management system 106 provides for automated tracking of the vehicles 102 based on the routes assigned by the fleet manager. For example, the route management system 106 receives sensor data describing the current location and/or motion of the vehicle 102, which the route management system 106 uses to track location of the vehicle 102 and to compute/update ETAs of stops along the route. As referred to herein, the terms "stop," "destination," and "location" may be used interchangeably and may have the same meaning. The sensor data may be received from the vehicle 102 and/or from a client device 104 of the vehicle operator in real time or periodically.

The route management system 106 uses the set of route variables defining a route along with the sensor data describing the geographic location and/or movement of the vehicle 102 to generate a route tracking report describing the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like. The route tracking report may include some or all of the information of the route including the route variables.

The route management system 106 uses geofences to determine when vehicles 102 have arrived and/or departed from scheduled stops along a route. A geofence is a virtual perimeter for a real-world geographic area. Geofences are established to encompass each scheduled stop along a route. The route management system 106 uses the geofences along with location data describing the current location of the vehicles 102 to determine whether the vehicles 102 have arrived and/or departed the scheduled stops. For example, the route management system 106 may determine that a vehicle 102 has arrived at a scheduled stop if the current location of the vehicle 102 has been within the geofence encompassing the scheduled stop for a threshold period of time. Similarly, the route management system 106 may determine that the vehicle 102 has departed the scheduled stop if the current location of the vehicle 102 is subsequently outside of the geofence encompassing the scheduled stop for another threshold period of time.

Figure 2:
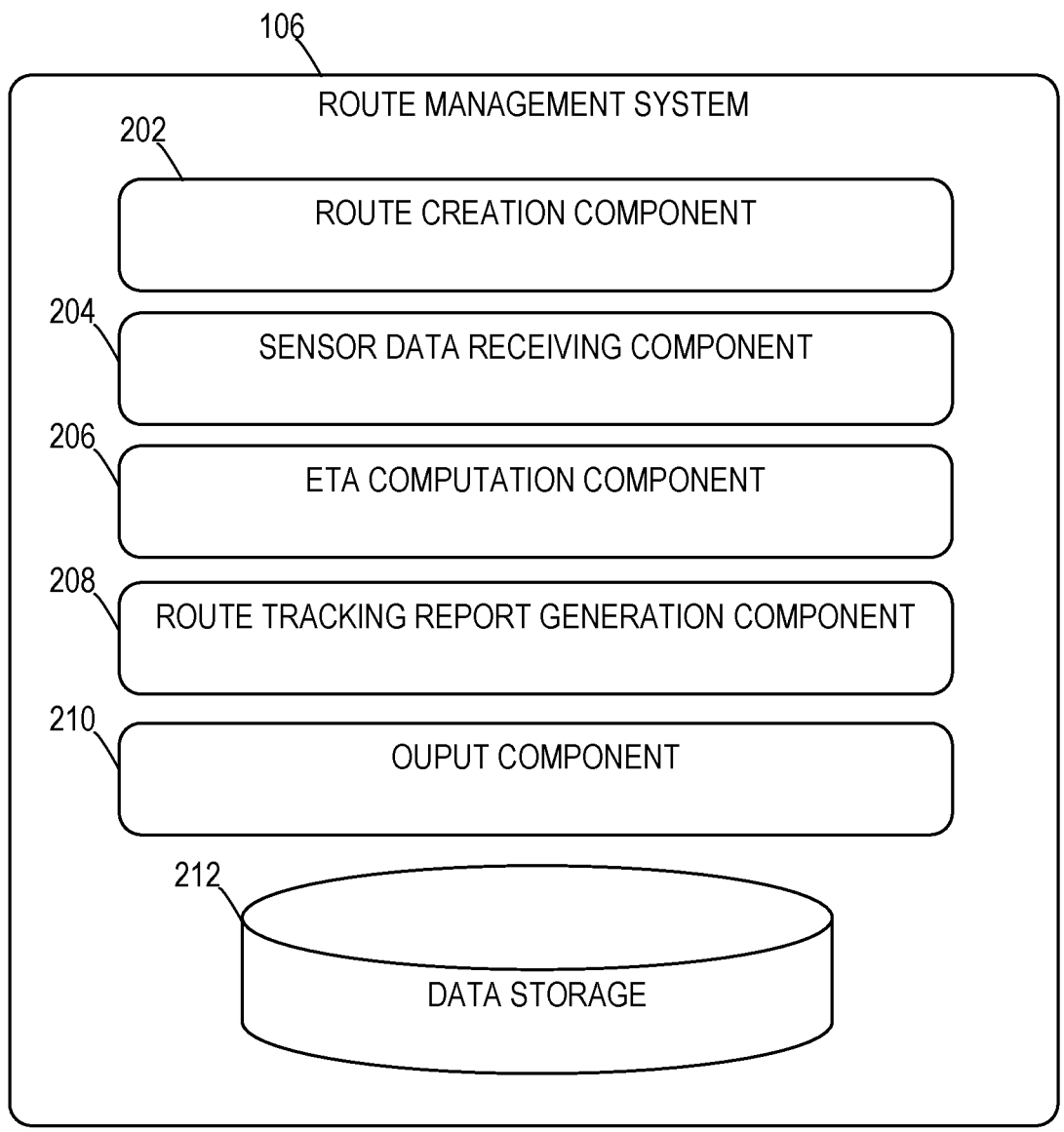
FIG. 2 is a block diagram of the route management system, according to some example embodiments.

FIG. 2 is a block diagram of the route management system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the route management system 106 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the route management system 106 includes a route creation component 202, a sensor data receiving component 204, an ETA computation component 206, a route tracking report generation component 208, an output component 210, and a data storage 212.

The route creation component 202 enables fleet managers to generate routes and assign routes to vehicles 102. For example, the route creation component 202 may provide a UI that allows fleet managers to generate vehicle routes. A vehicle route is a route to be traversed by a vehicle 102 that is defined by a set of route variables, discussed above. For example, the set of route variables may include a beginning and ending geographic location of the route, scheduled geographic stops along the route, an order at which the vehicle 102 is to stop at each scheduled stop, a scheduled beginning and ending time of the route, a scheduled arrival and departure time at the scheduled stops, and the like. The route variables may also include geographical locations of such stops or destinations, geofences associated with each stop or destination, and/or scheduled amount of time to be spent at each stop before departing to a subsequent stop or destination. The route variables may be stored as part of a route tracking report in data storage 212.

The UI provided by the route creation component 202 enables fleet managers to select the set of route variables for a route. For example, the UI may provide a listing of geographic locations and times that a fleet manager may select from to define a route. A fleet manager may use the UI to select geographic locations to be included in the route, such as a beginning location, end location, and scheduled stops, as well as select an order in which the geographic locations are to be traversed along the route. The UI may also enable a fleet manager to assign times to the selected geographic locations, such as scheduled start time, arrival time, and/or departure time for each. The UI may also enable the fleet managers to specify geographical locations of such stops or destinations, geofences associated with each stop or destination, and/or scheduled amount of time to be spent at each stop before departing to a subsequent stop or destination.

The UI may also enable fleet managers to assign the generated routes to individual vehicles 102 and/or vehicle operators. For example, the user interface may present a listing of individual vehicles 102 and/or vehicle operators from which the fleet manager may select. As another example, the user interface may enable an administrator to enter data identifying a vehicle 102 or vehicle operator, as well as enter a new vehicle 102 or vehicle operator. The UI may also enable the fleet managers to specify which of a set of routes assigned to a given vehicle 102 is currently active and being tracked. Tracking a route includes determining whether stops along the route have been completed or are scheduled for arrival. Stops that are being tracked can be used to generate ETAs of the corresponding stops.

The route creation component 202 stores data defining the created routes in the data storage 212, where it can be accessed by other components of the route management system 106. For example, the data stored in the data storage 212 may be associated with an account of the route management system 106 and/or specific vehicles 102 to which the route has been assigned.

The sensor data receiving component 204 receives sensor data used to provide automated route tracking. For example, the sensor data receiving component 204 receives sensor data describing the current location and/or motion of a vehicle 102. The sensor data may be received from the vehicle 102 and/or from a client device 104 of the vehicle operator that is operating the vehicle 102.

The route tracking report generation component 208 generates a route tracking report based on the route tracking performed by the ETA computation component 206. The route tracking report describes the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like.

The ETA computation component 206 provides for automated computation of ETAs of multiple stops along an active route. The ETA computation component 206 uses the set of route variables defining a route along with the sensor data received by the sensor data receiving component 204 to track the vehicle's 102 movement along its assigned route and compute the corresponding ETAs of each stop. This includes determining a current status (e.g., location) of the vehicle 102, whether the vehicle 102 has arrived at scheduled stops, departed from scheduled stops, and the like.

Figure 3:
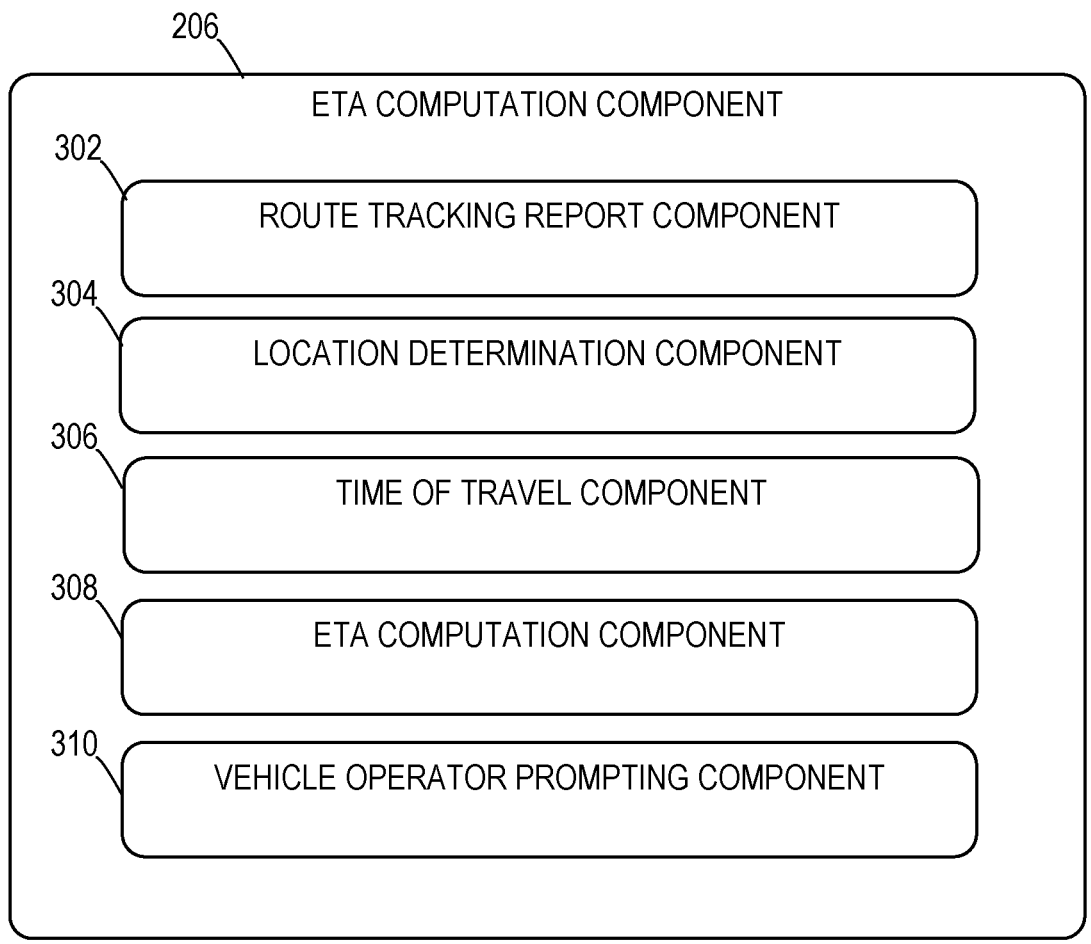
FIG. 3 is a block diagram of the ETA computation component, according to some example embodiments.

The ETA computation component 206 uses geofences to determine when vehicles 102 have arrived and/or departed from scheduled stops along a route. The ETA computation component 206 can present identifiers of multiple stops along a route and provide ETAs of each of the multiple stops along the route. As shown in FIG. 3, the ETA computation component 206 may include a route tracking report component 302, a location determination component 304, a time of travel component 306, an ETA computation component 308, and a vehicle operator prompting component 310.

The route tracking report component 302 can communicate with the route tracking report generation component 208 to access and obtain route information (e.g., a route tracking report) for a current route. The route information can include any of the route variables that form the route, such as the locations of the stops, the scheduled arrival/departure times of each stop, time to be spent at each stop, break times for a driver, and so forth. The route tracking report component 302 uses the route information to compute ETAs for each stop along the route.

Specifically, the route tracking report component 302 communicates with the location determination component 304 to determine a current location of the vehicle 102. The location determination component 304 communicates with one or more sensors that are part of or associated with the vehicle 102 to determine the current location of the vehicle 102, such as based on GPS coordinates obtained from a GPS sensor of the vehicle 102. The location determination component 304 can also obtain the GPS coordinates, geofences, addresses or other locations of each stop included as part of the route tracking report. The location determination component 304 provides the current location of the vehicle 102 and the locations of each stop of the route tracking report to the time of travel component 306.

Figure 4:
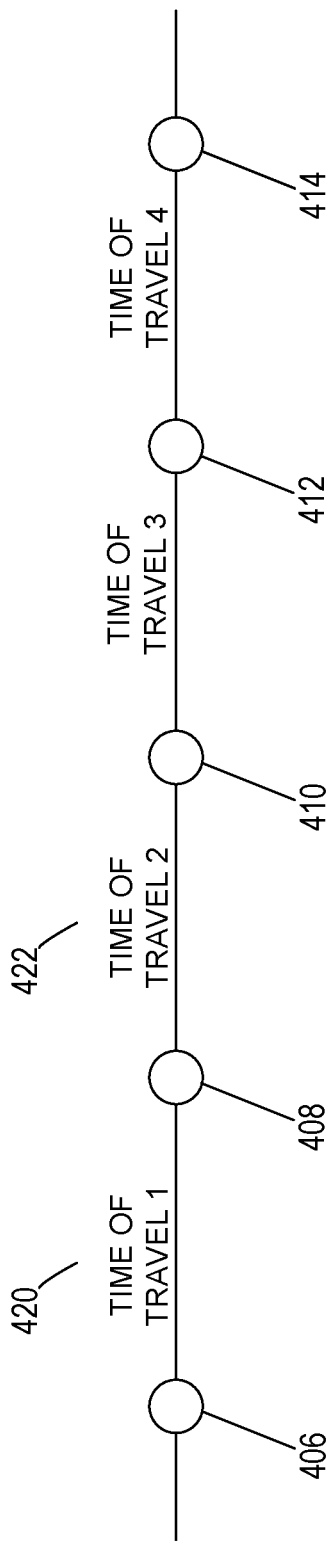
FIG. 4 illustrates multiple location times of travel, according to some example embodiments.

The time of travel component 306 computes an estimated travel time between each adjacent stop or location of the route tracking report and between the current location of the vehicle 102 and the next stop along the route. Specifically, as shown in FIG. 4, the time of travel component 306 identifies the current location 406 of the vehicle 102. The time of travel component 306 computes a first time of travel 420 between the current location 406 and a first stop 408. The time of travel component 306 computes a second time of travel 422 between the first stop 408 and a second stop 410 that is adjacent to the first stop 408. The time of travel component 306 computes a third time of travel between the second stop 410 and a third stop 412 that is adjacent to the second stop 410. The time of travel component 306 computes a fourth time of travel between the third stop 412 and a fourth stop 414 that is adjacent to the third stop 412.

In some examples, the time of travel component 306 communicates with an internal or external mapping application, software, or platform to obtain the time of travel between stops or destinations. Specifically, the time of travel component 306 can generate a query that includes a starting location (e.g., starting GPS coordinates or address) and an ending location (e.g., ending GPS coordinates or address). The query may also include a starting time for driving or commuting between the starting and ending locations. The query can be transmitted to the mapping application, which searches a list of databases to compute a distance between the starting and ending locations and estimated travel time (including or excluding traffic patterns depending on whether the starting time was or was not specified) between the starting and ending locations. The mapping application returns in response to receiving the query the estimated time of travel between the starting and ending locations.

For example, the time of travel component 306 can transmit a first query to the mapping application that includes the current location 406 of the vehicle 102 and the location of the first stop 408 (e.g., GPS coordinates or other location information of the first stop 408). The time of travel component 306 can also specify that the trip will start at the current time. In response, the mapping application returns the first time of travel 420 indicating how long it will take to drive or commute between the current location 406 of the vehicle 102 and the first stop 408. Simultaneously or sequentially after transmitting the first query, the time of travel component 306 can transmit a second query to the mapping application that includes the location of the first stop 408 and a location of the second stop 410 (e.g., GPS coordinates or other location information of the second stop 410). In some examples, the time of travel component 306 can access the route tracking report to obtain the scheduled departure time of the first stop 408. The time of travel component 306 can specify that the trip between the first stop 408 and the second stop 410 will start at the scheduled departure time of the first stop 408. The scheduled departure time indicates the time when the vehicle is scheduled to leave or finish unloading cargo at the first stop 408. In response, the mapping application returns the second time of travel 422 indicating how long it will take to drive or commute between the first stop 408 and the second stop 410 at the specified scheduled departure time of the first stop 408. The time of travel component 306 can similarly obtain estimated travel times between other, adjacent stops along the route.

Referring back to FIG. 3, the time of travel component 306 communicates the time of travel between each stop along the route and between the current location of the vehicle 102 and the next stop to the ETA computation component 308. The ETA computation component 308 uses the time of travel between each stop to compute the ETA of each stop. Specifically, the ETA computation component 308 determines the current time and the first time of travel 420 (between the current location 406 of the vehicle 102 and the first stop 408). The ETA computation component 308 adds time of travel 420 to the current time to compute the first ETA associated with the first stop 408.

In some examples, the ETA computation component 308 obtains the scheduled stop interval (e.g., the amount of time spent by the vehicle 102 at the first stop 408 determined by subtracting the scheduled departure time of the first stop 408 from the scheduled arrival time of the first stop 408). The ETA computation component 308 adds the scheduled stop interval to the first ETA and to the second time of travel 422

(between the first stop 408 and the second stop 410) to compute the second ETA associated with the second stop 410. The ETA computation component 308 can continue performing similar operations to compute the ETA of each of the remaining stops along the route (e.g., third and fourth stops 412 and 414).

In some examples, the ETA computation component 308 accesses a historical list of stopping times associated with the first stop 408 to estimate the scheduled stop interval. The historical list of stopping times can indicate a type of cargo, amount of cargo, time of day, type of vehicle, and associated amount of time spent by the vehicle at the first stop 408. The ETA computation component 308 can access the historical list to search the historical list based on the first ETA of the first stop 408, the type of cargo, amount of cargo, and type of vehicle specified by the route variables. The ETA computation component 308 can identify a match in the historical list of stopping times to at least a portion of the information specified in the route variables (e.g., one or more of the first ETA of the first stop 408, the type of cargo, amount of cargo, and type of vehicle). Based on the match, the ETA computation component 308 retrieves the estimated stopping interval indicating an estimated amount of time to be spent by the vehicle 102 at the first stop 408. The ETA computation component 308 can use the estimated stopping interval instead of the scheduled stop interval (determined by the manually input scheduled arrival and departure times) to compute the second ETA of the second stop 410.

The ETA computation component 308 provides the ETAs of each of the stops along the route to the vehicle operator prompting component 310. The vehicle operator prompting component 310 can generate a display that lists the ETAs of each stop along the route to an operator, customer, and/or a fleet manager. In some examples, the vehicle operator prompting component 310 sorts the ETAs chronologically and presents the sorted ETAs of each stop in a list of identifiers of the stops. For example, the vehicle operator prompting component 310 can present a first identifier (including a description of the first stop 408) and together with the first identifier, the vehicle operator prompting component 310 can present the first ETA associated with the first stop 408. The vehicle operator prompting component 310 can present a second identifier (including a description of the second stop 410) simultaneously with the first identifier and together with the first identifier, the vehicle operator prompting component 310 can present the second ETA associated with the second stop 410.

In some examples, the vehicle operator prompting component 310 can generate, for display, a first status associated with the first stop and a second status associated with the second stop, wherein the first status and the second status are displayed with the first and second identifiers. The first status can represent an enroute status indicating that the vehicle is currently driving towards the first stop. The second status can include a scheduled status indicating that the second stop is included in the route and will be driven to at a future time.

In some examples, the vehicle operator prompting component 310 can display a plurality of route identifiers associated with a plurality of routes, the plurality of routes comprising the route. The vehicle operator prompting component 310 can determine that a route identifier of the plurality of route identifiers corresponding to the route is associated with a currently active route. In response, the vehicle operator prompting component 310 displays, in association with the route identifier, a plurality of progress bars that include the first and second identifiers. Each progress bar of the plurality of progress bars can be associated with a respective stop of the set of stops along the route. The vehicle operator prompting component 310 receives input that identifies a given progress bar of the plurality of progress bars, the given progress bar corresponding to the first stop, such as by detecting that a cursor has been hovered over the given progress bar. In response, the vehicle operator prompting component 310 displays a prompt that includes the first ETA of the first stop and a description of the first stop.

In some examples, a first progress bar of the plurality of progress bars includes a first visual indicator (e.g., a first color) representing first route progress of the stop associated with the first progress bar. A second progress bar of the plurality of progress bars includes a second visual indicator (e.g., a second color different from the first color) representing second route progress of the stop associated with the second progress bar. A third progress bar of the plurality of progress bars includes a third visual indicator (e.g., a third color different from the first and second colors) representing third route progress of the stop associated with the third progress bar. The first route progress can represent a completed stop (in which the vehicle 102 has arrived at the geofence of the corresponding stop and then left the geofence of the stop). The second route progress can represent a stop currently being driven to and the third route progress can represent a stop that is included in the route and will be driven to at a future time but is not currently being driven to.

In some examples, the vehicle operator prompting component 310 can compare the current time to the ETAs of one or more stops along a route. The vehicle operator prompting component 310 can determine that a difference between the current time and the ETA of a given stop exceeds or transgresses a threshold value (e.g., 10 hours). In such cases, the vehicle operator prompting component 310 can prevent displaying the ETA in a UI in association with the given stop. In this way, the ETAs of stops that will be arrived at very far in the future can be prevented from being displayed to avoid confusing operators or fleet managers.

In some examples, the vehicle operator prompting component 310 can estimate a break time for a driver or operator of the vehicle 102. The vehicle operator prompting component 310 can access hours of service information associated with the driver specified in the vehicle tracking report. The vehicle operator prompting component 310 can predict or estimate that a break will need to take place at some point along the route and can predict the amount or duration of the break. The vehicle operator prompting component 310 can determine that the break will take place before a third stop along the route is reached and after the driver leaves a second stop. In response, the vehicle operator prompting component 310 can add the break time to update the ETA of the third stop.

In some examples, the vehicle operator prompting component 310 can determine whether the vehicle 102 is operating according to schedule. Namely, the vehicle operator prompting component 310 can determine if the current time is later than the ETA of an upcoming stop. In such cases, the vehicle operator prompting component 310 can determine that the vehicle 102 is currently late. In response, the vehicle operator prompting component 310 can transmit a notification or alert to a fleet manager or operator indicating that the vehicle 102 is late. In some cases, the vehicle operator prompting component 310 can send the notification if the difference between the current time and the ETA of the upcoming stop is greater than a threshold value (e.g., 30 minutes or 1 hour). Namely, the vehicle operator prompting component 310 may send the notification indicating the vehicle 102 is late if the vehicle 102 is late by more than 30 minutes or 1 hour relative to the computed ETA. In some examples, this notification can be presented to an operator on a UI of the operator of the vehicle 102.

Referring back to FIG. 2, the output component 210 provides the route tracking report to a fleet manager or other user. For example, the output component 210 may transmit the route tracking report to the client device 104 of a fleet manager or other user via email, text message, and the like. As another example, the output component 210 may provide the route tracking report within a user interface that can be accessed by a fleet manager. For example, a fleet manager may use a client device 104 to interact with the route management system 106 to and access the user interface provided by the output component 210.

The output component 210 may also transmit notifications based on the data included in a route tracking report. For example, the output component 210 may transmit a notification to a client device 104 of a vehicle operator indicating that the vehicle operator has missed a scheduled stop, is behind schedule, is not following the correct route, and the like. Similarly, the output component 210 may transmit a notification to a client device 104 of a fleet manager or other user to provide status updates associated with a route, such as the vehicle 102 having started at a route, arrived at a scheduled stop, left a scheduled stop, missed a scheduled stop, completed the route, and the like.

Figure 5:
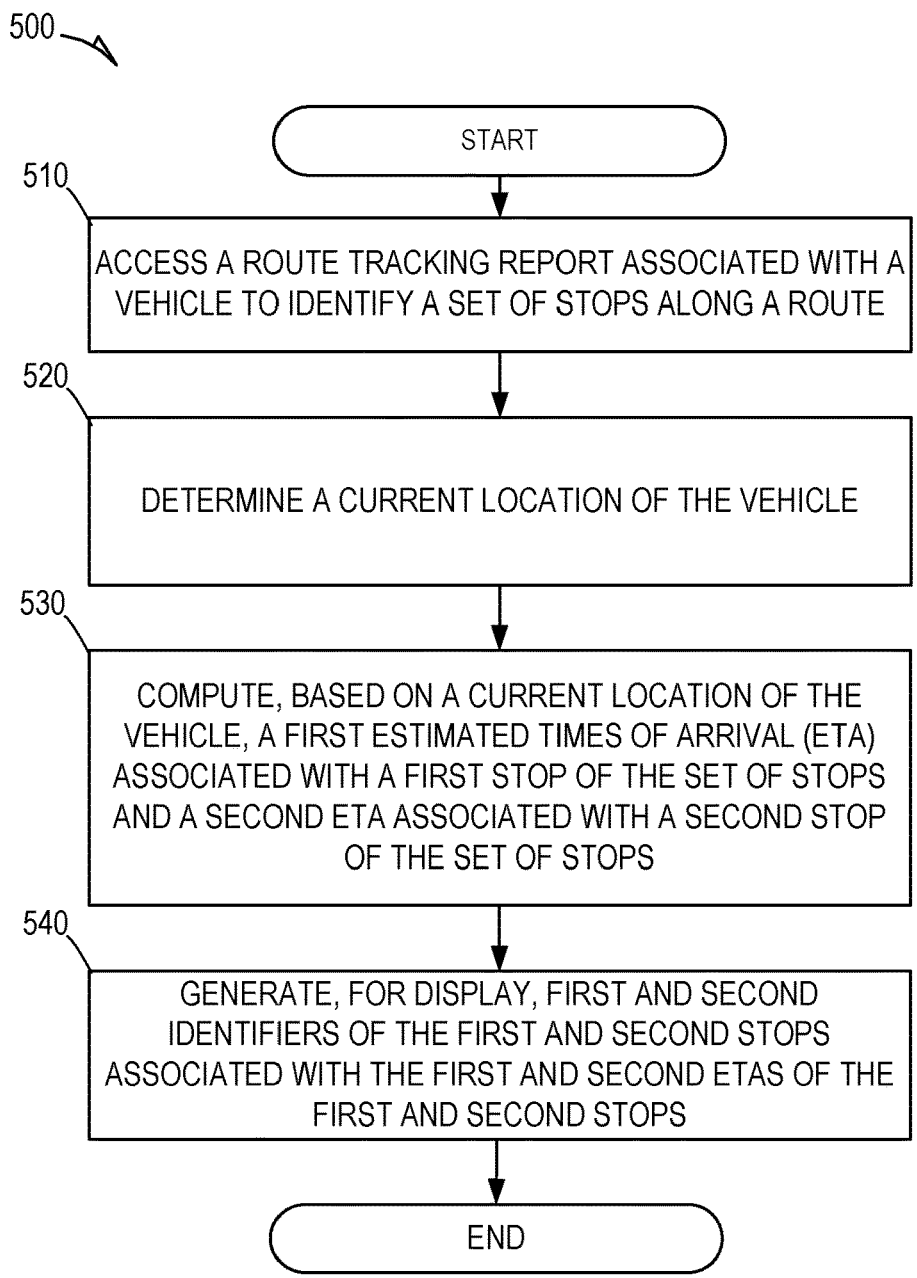
FIG. 5 is a flowchart showing a process for computing multiple stop ETAs along a route, according to some example embodiments.

FIG. 5 is a flowchart showing a process 500 for computing multiple stop ETAs along a route, according to some example embodiments. The process 500 may be embodied in computer-readable instructions for execution by one or more processors such that the operations of the process 500 may be performed in part or in whole by the route management system 106; accordingly, the process 500 is described below by way of example with reference thereto. However, it shall be appreciated that at least some of the operations of the process 500 may be deployed on various other hardware configurations and the process 500 is not intended to be limited to the route management system 106.

At operation 510, the route management system 106 accesses a route tracking report associated with a vehicle to identify a set of stops along a route, as discussed above.

At operation 520, the route management system 106 determines a current location of the vehicle, as discussed above.

At operation 530, the route management system 106 computes, based on a current location of the vehicle, a first ETA associated with a first stop of the set of stops and a second ETA associated with a second stop of the set of stops, as discussed above.

At operation 540, the route management system 106 generates, for display, first and second identifiers of the first and second stops associated with the first and second ETAs of the first and second stops, as discussed above.

Figure 6:
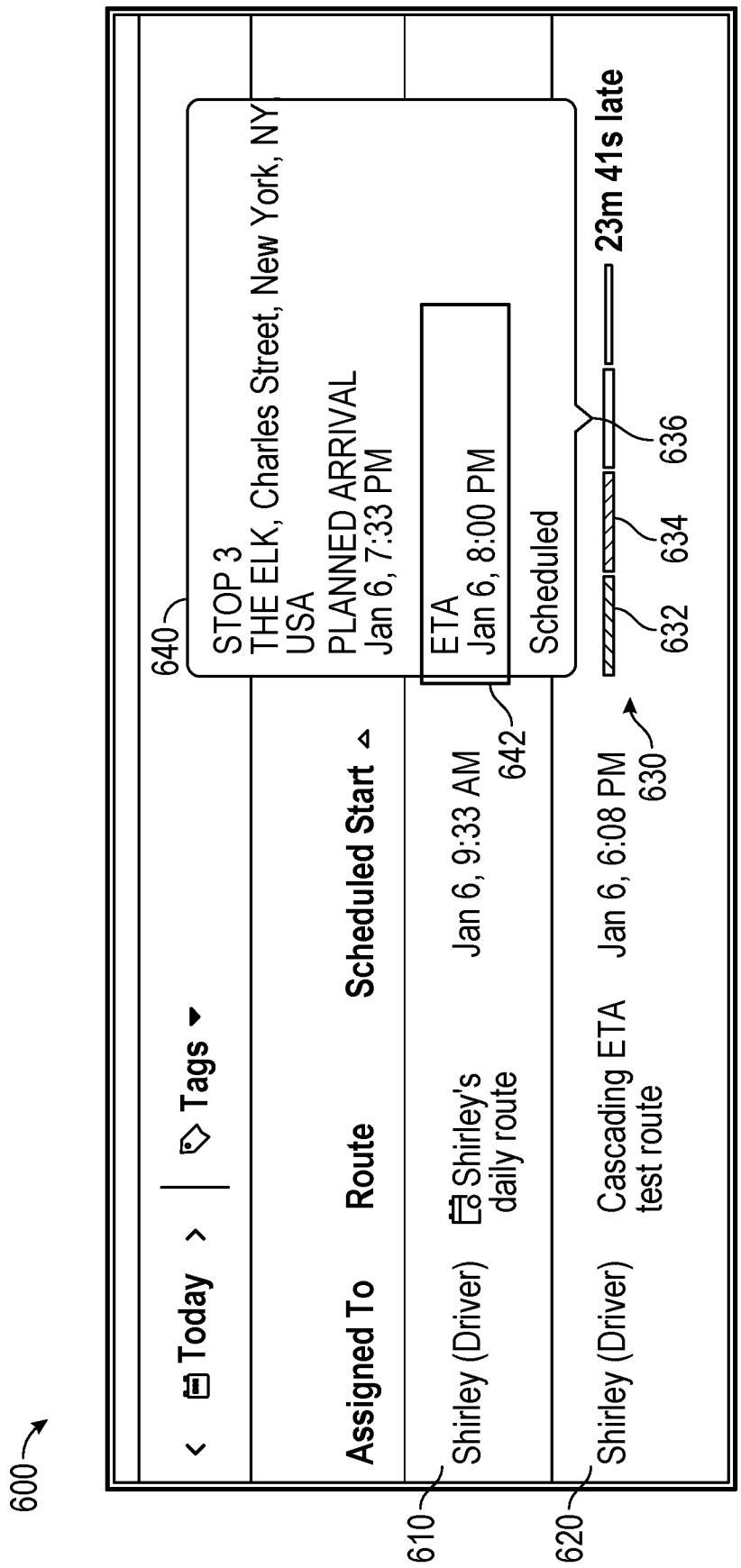
FIG. 6 is an example user interface for displaying multiple stop ETAs along a route, according to some example embodiments.

FIG. 6 is an example UI 600 for displaying multiple stop ETAs along a route, according to some example embodiments. The UI 600 includes a list of routes including a first route 610 and a second route 620. The first and second routes 610 and 620 may be assigned to the same driver or operator of a vehicle 102. The route management system 106 determines that the second route 620 is currently an active route. In response, the route management system 106 presents a plurality of progress bars 630.

Each progress bar of the plurality of progress bars 630 can be associated with a different stop along the second route 620. For example, a first progress bar 632 can be associated with a first stop, a second progress bar 634 can be associated with a second stop (that will be driven to immediately following completion of the first stop), and a third progress bar 636 can be associated with a third stop (that will be driven to immediately following completion of the second stop). The route management system 106 can obtain ETAs of each of the stops associated with the second route 620. The route management system 106 can receive input that highlights, identifies, selects, and/or hovers a cursor over a given progress bar, such as the third progress bar 636. In response, the route management system 106 presents a prompt 640 with information about the third stop corresponding to the third progress bar 636. The prompt 640 includes details about the third stop including a title, description, or address of the third stop along with the ETA 642 computed for the third stop. The prompt 640 also indicates a status, such as scheduled, completed, skipped, enroute for the third stop.

In some examples, each of the plurality of progress bars 630 can be visually distinguished or associated with a visual indicator to represent progress of the corresponding stop. For example, the first progress bar 632 includes a first visual indicator (e.g., a first color) representing first route progress of the stop associated with the first progress bar, such as a completed stop. The second progress bar 634 includes a second visual indicator (e.g., a second color different from the first color) representing second route progress of the stop associated with the second progress bar, such as a stop currently being driven to (e.g., an enroute progress). A third progress bar of the plurality of progress bars includes a third visual indicator (e.g., a third color different from the first and second colors) representing third route progress of the stop associated with the third progress bar, such as a stop that is included in the route and will be driven to at a future time but is not currently being driven to (e.g., a scheduled stop).

In some examples, the route management system 106 can compare the current time with the ETA of the next stop along the route or ETAs of one or more other stops along the route. The route management system 106 can determine if the current time is later than the ETA of one of the stops. In such cases, the route management system 106 can determine by how much the current time differs from the ETA of a particular stop to determine how late the vehicle 102 is along the route. The route management system 106 can present the amount of time the vehicle 102 is late in the portion of the UI 600 corresponding to the currently active route, such as the second route 620. In some examples, the route management system 106 can compare the ETA of a given stop to the scheduled arrival time of the given stop specified in the route tracking report. The route management system 106 can determine that the ETA of the given stop is later than the scheduled arrival time. In response, the route management system 106 can determine that the vehicle 102 will likely arrive late to the given stop. In such cases, the route management system 106 can present a notification or alert to the operator, customer and/or fleet manager indicating that the vehicle 102 will arrive late. In some cases, the route management system 106 computes a difference between the scheduled arrival time and the ETA of the given stop to determine the approximate amount of time by which the vehicle 102 will be late to arrive at the given stop. This approximate amount of time can be presented to the customer, fleet manager and/or vehicle operator or driver.

Figure 7:
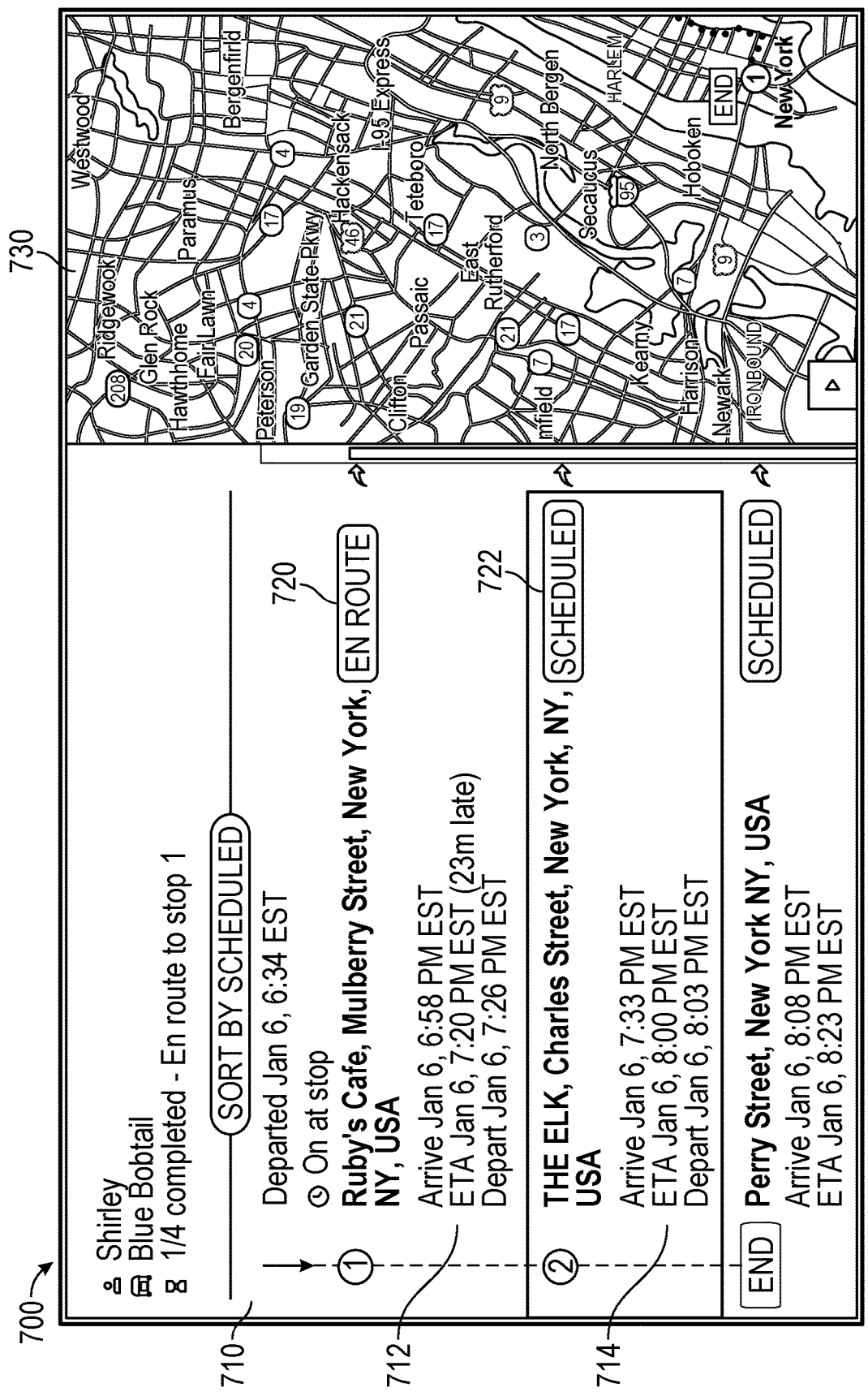
FIG. 7 is an example user interface for displaying multiple stop ETAs along a route, according to some example embodiments.

FIG. 7 is an example UI 700 for displaying multiple stop ETAs along a route, according to some example embodiments. The UI 700 includes a list of identifiers representing different stops along a route 710. For example, a first identifier 712 can be associated with a first stop and includes details about the first stop including a title, description or address of the first stop along with the ETA computed for the first stop. The first identifier 712 also indicates a status 720, such as scheduled, completed, skipped, enroute for the first stop. A second identifier 714 can be associated with a second stop and includes details about the second stop including a title, description or address of the second stop along with the ETA computed for the second stop. The second identifier 712 (presented together with the first identifier 712) also indicates a status 722, such as scheduled, completed, skipped, enroute for the second stop. In this way, the operator, customer, and/or fleet manager can see simultaneously in the same UI 700 the list of ETAs of different stops along the active route 710.

In some examples, the route management system 106 can compare the scheduled arrival time for the first stop with the ETA of the first stop to determine if the vehicle 102 will arrive late to the first stop. In response to determining that the vehicle 102 will arrive late to the first stop, the route management system 106 displays an alert (e.g., an amount of time by which the vehicle 102 will be late to the first stop in a red font or different font than fonts of other information included in the first identifier 712). The alert can specify the difference between the scheduled arrival time and the ETA of the first stop.

In some examples, the route management system 106 receives input that selects a given identifier of a stop along the route 710. In response, the route management system 106 presents a map 730 that visually depicts the path from the current location of the vehicle 102 to the stop associated with the given identifier. The map 730 can be presented simultaneously with the identifiers 712 and 714 (e.g., the various ETAs of the stops along the route 710).

Software Architecture

Figure 8:
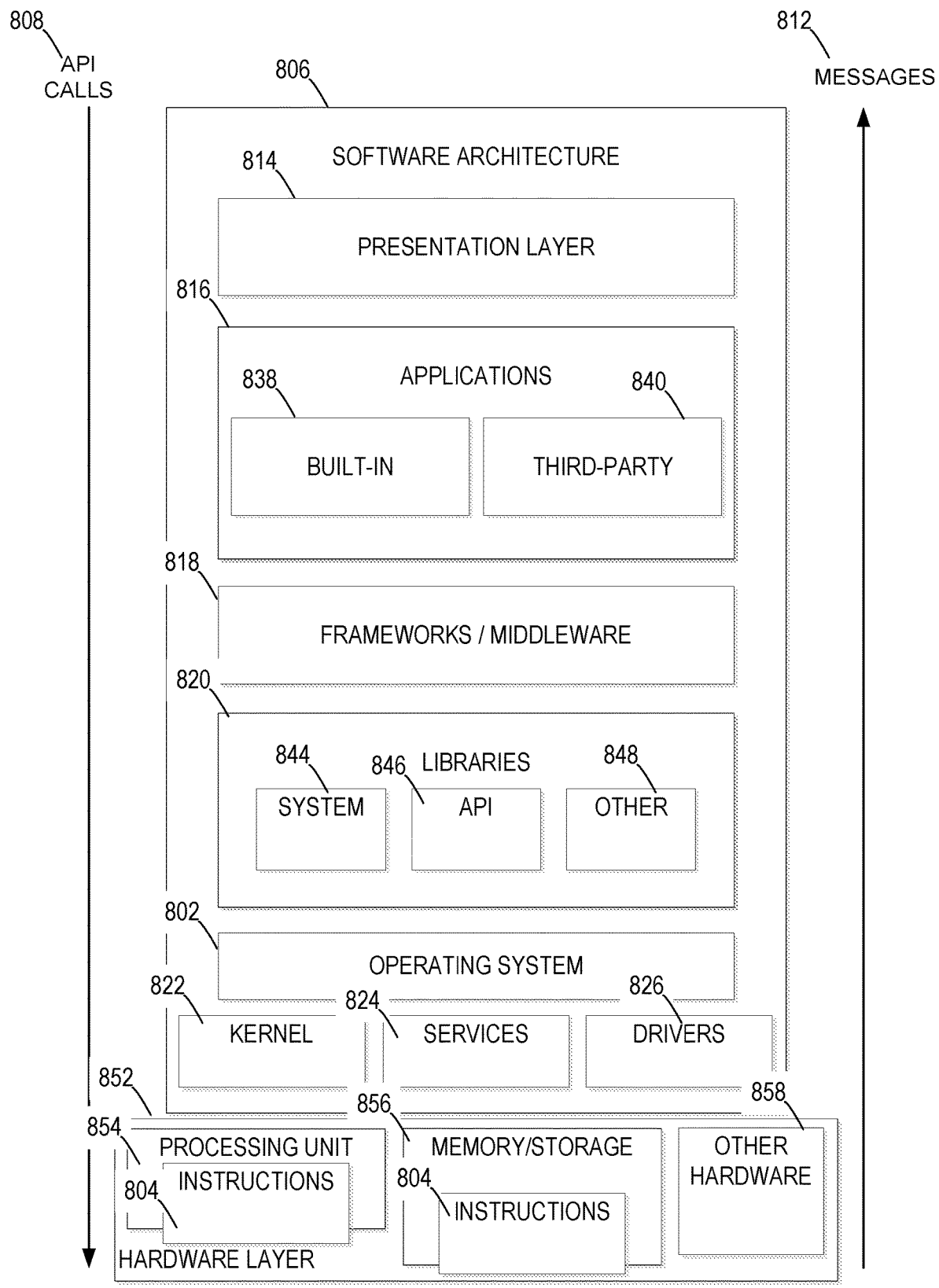
FIG. 8 is a block diagram illustrating an example software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke application programming interface (API) calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
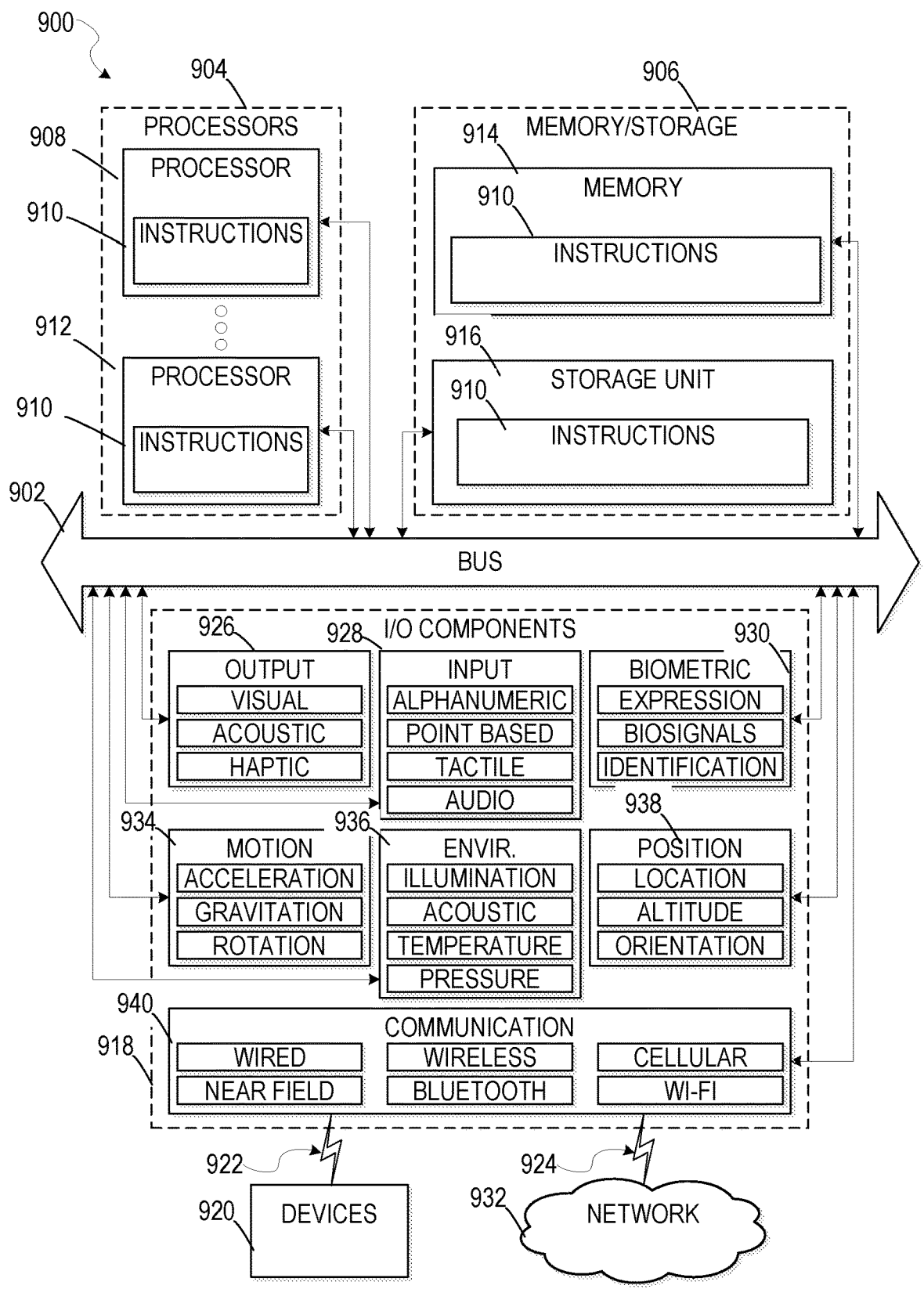
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor 904) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 904 may further be a multi-core processor having two or more independent processors 904 (sometimes referred to as "cores") that may execute instructions 910 contemporaneously.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context refers to an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTMs are well-suited for the classification, processing, and prediction of time series, given time lags of unknown size and duration between events.

What is claimed is:

1. A method comprising:
accessing a route tracking report associated with a vehicle to identify a set of stops along a first route;
determining a current location of the vehicle;
computing, based on a current location of the vehicle, a first estimated time of arrival (ETA) associated with a first stop of the set of stops and a second ETA associated with a second stop of the set of stops;
displaying a first route identifier corresponding to the first route in a first region of a display together with a second route identifier corresponding to a second route in a second region of the display; and
generating, for simultaneous display within the first region of the display in which the first route identifier is displayed and together with the second route identifier, first and second identifiers of the first and second stops associated with the first and second ETAs of the first and second stops, the first identifier of the first stop being displayed in a first progress indicator adjacent to a second progress indicator in which the second identifier of the second stop is displayed.

2. The method of claim 1, further comprising sorting the first and second identifiers chronologically based on the first and second ETAs of the first and second stops.

3. The method of claim 1, further comprising:
generating, for display, a first status associated with the first stop and a second status associated with the second stop, wherein the first status and the second status are displayed with the first and second identifiers.

4. The method of claim 3, wherein the first status comprises an enroute status indicating that the vehicle is currently driving towards the first stop, and wherein the second status comprises a scheduled status indicating that the second stop is included in the route and will be driven to at a future time.

5. The method of claim 1, further comprising:
displaying a plurality of route identifiers associated with a plurality of routes, the plurality of routes comprising the route;
determining that the first route identifier of the plurality of route identifiers corresponding to the first route is associated with a currently active route; and
in response to determining that the first route identifier is associated with the currently active route, displaying, in association with the first route identifier, a plurality of progress bars comprising the first and second identifiers, each progress bar of the plurality of progress bars being associated with a respective stop of the set of stops along the route.

6. The method of claim 5, further comprising:
receiving input that identifies a given progress bar of the plurality of progress bars, the given progress bar corresponding to the first stop, the first progress indicator comprising the given progress bar; and
in response to receiving the input, displaying a prompt comprising the first ETA of the first stop and a description of the first stop.

7. The method of claim 6, wherein the input comprises hovering a cursor over the given progress bar.

8. The method of claim 5, wherein a first progress bar of the plurality of progress bars comprises a first visual indicator representing first route progress of the stop associated with the first progress bar, the first progress indicator comprising the first progress bar, wherein a second progress bar of the plurality of progress bars comprises a second visual indicator representing second route progress of the stop associated with the second progress bar, the second progress indicator comprising the second progress bar, and wherein a third progress bar of the plurality of progress bars comprises a third visual indicator representing third route progress of the stop associated with the third progress bar.

9. The method of claim 8, wherein the first route progress represents a completed stop, wherein the second route progress represents a stop currently being driven to, and wherein the third route progress represents a stop that is included in the first route and will be driven to at a future time.

10. The method of claim 1, further comprising:
querying a mapping application based on the current location and a first location of the first stop to determine a first time of travel between the current location and the first location of the first stop;
determining the first ETA based on a current time and the first time of travel;
querying the mapping application based on the first location of the first stop and a second location of the second stop to determine a second time of travel between the first stop and the second stop; and
determining the second ETA based on the first ETA and the second time of travel.

11. The method of claim 10, further comprising adding the second time of travel to the first ETA to compute the second ETA.

12. The method of claim 10, further comprising:
determining a stopping time associated with the first stop, the stopping time representing a length of time spent by the vehicle at the first stop before departing the first stop; and
updating the second ETA based on the stopping time associated with the first stop.

13. The method of claim 1, further comprising:
determining that a current time is later than the ETA associated with the second stop to which the vehicle has not yet arrived;
computing a difference between the current time and the ETA associated with the second stop to determine how late the vehicle is along the first route; and
displaying the difference between the current time and the ETA associated with the second stop concurrently with the first and second identifiers.

14. The method of claim 12, further comprising:
accessing historical stopping times associated with the first stop, the historical stopping times representing a plurality of lengths of time spent, by a plurality of vehicles carrying similar cargo as the vehicle, at the first stop before departing the first stop; and
estimating the stopping time based on the historical stopping times associated with the first stop.

15. The method of claim 1, further comprising:
preventing display of a third identifier of a third stop that is associated with a future ETA that exceeds a current time by more than a threshold amount.

16. The method of claim 10, further comprising:
estimating a break time for a driver of the vehicle based on hours of service in formation associated with the driver; and
updating at least one of the first or second ETAs based on the estimated break time.

17. The method of claim 1, further comprising:
determining that a difference between a current time and the second ETA transgresses a threshold value; and
preventing presentation of the second ETA in response to determining that the difference transgresses the threshold value.

18. The method of claim 1, further comprising:
determining that the vehicle has arrived at the first stop in response to determining that the vehicle has been within a geofence encompassing the first stop for a first threshold period of time;
determining that the vehicle has departed from the first stop in response to determining that the vehicle has been outside the geofence encompassing the first stop for a second threshold period of time; and
generating one or more alerts based on the first and second ETAs of the first and second stops.

19. A route management system comprising:
one or more computer processors; and
one or more computer-readable mediums storing instructions that, when executed by the one or more computer processors, cause the route management system to perform operations comprising:
accessing a route tracking report associated with a vehicle to identify a set of stops along a first route;
determining a current location of the vehicle;
computing, based on a current location of the vehicle, a first estimated time of arrival (ETA) associated with a first stop of the set of stops and a second ETA associated with a second stop of the set of stops;
displaying a first route identifier corresponding to the first route in a first region of a display together with a second route identifier corresponding to a second route in a second region of the display; and
generating, for simultaneous display within the first region of the display in which the first route identifier is displayed and together with the second route identifier, first and second identifiers of the first and second stops associated with the first and second ETAs of the first and second stops, the first identifier of the first stop being displayed in a first progress indicator adjacent to a second progress indicator in which the second identifier of the second stop is displayed.

20. A non-transitory computer-readable medium storing instructions that, when executed by one or more computer processors of a route management system, cause the route management system to perform operations comprising:
accessing a route tracking report associated with a vehicle to identify a set of stops along a first route;
determining a current location of the vehicle;
computing, based on a current location of the vehicle, a first estimated time of arrival (ETA) associated with a first stop of the set of stops and a second ETA associated with a second stop of the set of stops;
displaying a first route identifier corresponding to the first route in a first region of a display together with a second route identifier corresponding to a second route in a second region of the display; and
generating, for simultaneous display within the first region of the display in which the first route identifier is displayed and together with the second route identifier, first and second identifiers of the first and second stops associated with the first and second ETAs of the first and second stops, the first identifier of the first stop being displayed in a first progress indicator adjacent to a second progress indicator in which the second identifier of the second stop is displayed.

\* \* \* \* \*

UNITED STATES PATENT AND TRADEMARK OFFICE
CERTIFICATE OF CORRECTION

PATENT NO. : 11,674,813 B1
APPLICATION NO. : 17/811034
DATED : June 13, 2023
INVENTOR(S) : Chung et al.

Page 1 of 1

It is certified that error appears in the above-identified patent and that said Letters Patent is hereby corrected as shown below:

In the Claims

In Column 27, Line 59, in Claim 16, delete "in formation" and insert --information-- therefor Signed and Sealed this
First Day of October, 2024

Katherine Kelly Vidal
Director of the United States Patent and Trademark Office